United States Patent Office 2,929,794
Patented Mar. 22, 1960

2,929,794

COMPOSITION COMPRISING POLYESTER-POLY-ISOCYANATE REACTION PRODUCT AND POLYSULFIDE POLYMER

Eli Simon, Los Angeles, and Frank W. Thomas, Burbank, Calif., assignors to Lockheed Aircraft Corporation, Burbank, Calif.

No Drawing. Application September 13, 1954
Serial No. 455,766

6 Claims. (Cl. 260—45.4)

This invention relates to organic chemical compositions and relates more particularly to resinous products or compositions useful as coatings, sealants, films, impregnating materials, adhesives, etc.

It is an object of the invention to provide resins or resinous products that polymerize and air cure at room temperatures to form tough, flexible, resilient coatings, films, caulkings, sealants, and the like. These resins or resinous materials may be used as one hundred percent solids content resins or in resin-solvent combinations and may be applied in practically any selected manner to metals, wood, plastics, paper, and the like, to constitute protective coatings, may be used as impregnating materials for fabrics, screens, papers, and other porous and semi-porous materials, may be used as moisture proof coatings for moisture sensitive materials of various kinds, and may be applied to mandrels for subsequent removal therefrom in the cured condition as plastic films. The adhesion of the resinous material to fabrics, wood and porous surfaces is excellent and they may be employed to form transparent or semi-transparent elastic coatings or, if desired, may incorporate pigments, plasticizers, and other modifiers, fillers, and the like. Appropriate or required variations in the physical characteristics of the resultant coatings, films, etc. such as the toughness, elasticity, temperature resistance, are obtained by selection of the resin components and the resins may be prepared to best adapt them for the intended mode of application such as brushing, dipping, spraying, blading, rolling, and the like.

Another object of our invention is to provide resin compositions useful as elastomeric sealing and caulking materials that are resistant to water, oils, aromatic-aliphatic fuels, etc., that preserve excellent adhesion to most solids and that retain their flexibility and elasticity throughout a wide temperature range. The sealants of the invention air cure at room temperature to tough, rubbery adherent void free fillets, films, or bodies, that are highly water, oil and hydrocarbon fuel resistant, and that remain flexible, elastic and crack free over a wide temperature range. We have found that the cure of these sealants is materially accelerated by the use or incorporation of a special two-part catalyst system. The applied sealants will cure in thick or large sections without the formation of voids while retaining their flexible, elasticity, adhesion and resistance to water, oils, and the like.

It is a further object of the invention to provide resinous products or materials which, when used as coatings, films, etc. will air cure in thin layers of less than one-half mil and up to 100 mils thickness by reason of the structure of the resins which enables them to react with the moisture of the air to polymerize into tough, resilient, adherent, elastomeric coatings and when said resinous materials are used as sealants, putties, etc. this atmospheric-moisture curing reaction materially assists the catalyst system in effecting the cure. In the case of the thin or relative thin films, coatings, etc. the air cure is effective at room temperature and a relative humidity of from 20 to 98% by reason of said reaction and without the use of catalysts, oxygen, or drier activators. However, where the resins are used as or incorporated in sealants, caulking compounds, putties, and the like, it is desirable to expedite or accelerate the cure by means of a catalyst system aided by the atmospheric moisture reaction cure.

The resinous materials of the invention are useful as adhesives, interlayer materials, special electrically conductive layers or coatings, etc. and where we refer herein to coatings and sealants, other uses and applications are to be understood as comprehended by such terms.

The resinous products or resinous compositions of the invention are fluid derived polymers or copolymers of polyisocyanates, polyisothiocyanates, and their blends with polylabile hydrogen-containing compounds and contain reacted or partially reacted polyisocyanates, polyisothiocyanates, and their blends. Typical of the resins which have chemical compositions suitable for modification by the polyisocyanate or polyisothiocyanate resinous reaction products of this invention are Thiokols, polyesters, polyamides, polyureas, polyesteramides, polyurethanes and blends or combinations of such resins. Although the resinous compounds or resins are synthesized in accordance with the known rules of polymer formation, the selection of their components and the manner and sequence of combining their components have been found to be productive of unusual characteristics, particularly well suiting them for use as films, coatings, sealants, or components of such products. A characteristic requirement for the isocyanate-containing resins of this invention is that they include or consist of polymer chains or systems of polymer chains containing active or functional chemical groupings at given or specified intervals by means of which the chains or chain systems are caused to be bound one to the oher. The selected molecular units are caused to conform to typical patterns. The selected molecular components are representative of, but are not exclusive of, applicable units known in the art. Two general types of polymers are basically suitable. The first is an anchored linear polymer chain containing reactive functional groups at specified intervals and the second are linear polymers which do not initially contain such anchor units but which have these anchor units formed or supplied during the final reaction and/or cure of the resinous products. The resins or resinous products of the invention are the result of the chemical reaction of polyisocyanates or polyisothiocyanates, or their blends, of from 15 to 85 mol percent of either component, with polylabile hydrogen type compounds such as acids, alcohols, silicols, enols, amines, imines, amidines, amides, ureas, thioureas, thioamides, mercaptans, aldols, aminoalcohols, ureides, thiolic acids, hydraoxamic acids, hydrazines, etc.

The resins or resinous materials of the invention fall into two general categories or classes which will herein be referred to as resins A and resins B. The components of a type A resin or a type B resin are not all permitted to compete one with the other simultaneously for the active or functional groups of a present coreactant molecule. In the preparation of the resins it is preferred that an initial reaction occur in accordance with a given order of component addition to obtain reproducible, controllable and predetermined results. A preferred order of reaction of the components in preparing an A type resin is: First, a reaction between (1) a diisocyanate, polyisocyanate, polyisothiocyanate, or blends thereof, and (2) diols, such as polyglycols, linear aliphatic glycols, or substituted or unsubstituted modifications and blends thereof. The diols may be replaced to an extent up to 40% by weight of nitrogen base resinous compositions having a molecular weight of between 500 and 10,000, these nitrogen base resinous compositions being the reaction products of dibasic alkyl carboxylic acids with amino alcohols and alkylamines, and the self esterified reaction products of linear alkyl amino acids, or by polymeric polysulfides within the molecular weight range of from 200 to 10,000, the latter being known commercially as Thiokol base compounds. These Thiokol compounds are preferably the reaction products of dihaloalkylformals, sodium polysulfide and trihaloalkyls such as reaction products of dichloroethylformal, sodium polysulfide and trichloropropane. As will be described later in more detail, the resins or resinous compositions of the invention, which include the Thiokols as components thereof, are particularly well suited for use as or for preparing sealant materials, putties, and the like.

The second stage in the preparation of an A type resin is the addition to the initial reaction product of a bifunctional acid such as a linear hydroxy acid, a dicarboxylic acid, an amino acid, or unsaturated, substituted modifications or blends of the same and water, the resultant mixture reacting to form what may be termed an intermediate. The third stage in the preparation or reaction of an A type resin is the reaction between the pre-reticulated polymers resulting from the first and second stages of reaction above described and a reticulating agent which is a trifunctional molecule containing alcohol, carboxylic acid, amine or mercaptan groups, or mixtures of the same. The preparation or reaction of an A resin is concluded when the resultant resin reaches an amine equivalent of from 150 to 1,000, an amine equivalent value of approximately 500 being preferred. In describing the preparation or reaction of the A resins as well as the B resins the reticulating agents referred to are comprised of a molecule containing more than two functional groups comprising isocyanates, isothiocyanates and the above mentioned polylabile hydrogen compounds.

The preferred method of preparing or reacting a B type resin first includes the bringing about of a reaction between one or more diisocyanates and one or more diols, this being the same as the first stage reaction in preparing an A resin. The second stage in preparing a B resin involves the reaction between the product of the first reaction and polymers or blends of polymers, which we will designate C class resins, and water and, thirdly, and finally, the reaction between the pre-reticulated polymer resulting from the first and second reactions and a reticulating agent, namely a trifunctional molecule containing alcohol, carboxylic acid, amine or mercaptan groups or mixtures of these. The reaction in preparing a B class resin is concluded when the amine equivalent of the resin reaches a value of from 150 to 1,000, the preferred value being approximately 350. The resins of the C class utilized in preparing a B type resin, as just described, may be grouped or classified, as follows:

C Type I, polyesters such as the reaction products between dibasic acids and dihydric alcohols
C Type II, nitrogen base polymers such as polyamides, and/or esteramides
C Type III, silicon base polymers such as silico polyesters
C Type IV, sulphur base polymers, such as polymeric polysulfides.

In synthesizing or preparing the Class B resins of the invention, modifying resins are used as reactant intermediate resins, these intermediate resins containing or having labile hydrogen atoms capable of reacting with the isocyanate or polyisothiocyanate-isocyanate blends. These modifying resins are polyesters, polyamides and esteramides, silicol polyesters or polysulfide resins. The polyesters are the reaction products of saturated, unsaturated, substituted or unsubstituted alkyl polyfunctional alcohols and acids, preferably dibasic carboxylic acids and alcohols, and have an acid number range of from 0.1 to 200, preferably about 50. The polyamides and esteramides are the self-polymerization reaction products by way of the bifunctional condensation of amino acids, of the bifunctional reaction products of amino alcohols with dibasic carboxylic acids or mixtures thereof. These polyamides and esteramides preferably have a molecular weight of from 500 to 10,000. The silico polyesters useful as the modifying resins are the reaction products of organic bifunctional silanols, silacols or condensed silacols, such as linear alkyl polyhydroxy polysiloxanes with the alcohols or acids or amines such as used in the preparation of the above described polyesters and polyamides. The molecular weight of the silico polyesters may range between 500 and 10,000.

The preferred examples of the polyester resins suitable as modifiers for the type B resins of the invention include reaction products of 1,3 butylene glycol employed in the molecular range of from 80 to 50% and sebacic acid employed in the molecular percentage range of from 20 to 50%, such resins having an acid number range of from 20 to 150. Other glycols that may be used in such resins, either individually or in mixtures, include propylene, pentylene, hexylene, dipropylene glycol, diethylene and triethylene glycols, as well as the following diols: (2,2-diethyl-1,3-propanediol), (2-ethyl hexane diol-1,3), (2-ethoxy-methyl-2,4-dimethyl pentanediol, 1-5), (2-methyl 2-propyl-1,3-propanediol), and substituted and unsaturated homologues of the same. Other typical or representative dibasic acids that may be employed are succinic, malonic, adipic, glutaric, suberic, octadecadiendioic, maleic, fumaric, azaleic, itaconic, citraconic and their saturated and unsaturated substituted or unsubstituted homologues. The invention also contemplates the use of mixed polyesters as the polyester resin modifiers for the B type resins of the invention. Such mixed polyesters include diethylene glycol adipate-sebacate, propylene glycol-butylene glycol-sebacate, and propyleneglycol-butylene glycol-sebacate-succinate.

Where the resinous products of the invention are to be used as putties, sealants, caulking compounds, etc. or as the resinous ingredients of such putties, sealants, etc. it has been found most practical to utilize these resinous products with the C Type IV modifying resins. These C Type IV resins include or comprise polysulfide liquid polymers and are essentially reaction products derived from organic mono, di and tri halides and sodium polysulfide, the polymer segments being linked together by sulphur bonds. The functional groups contain hydrogens which are reactive to the isocyanate radical and may consist of mercaptan groups such as terminal mercaptan groups, hydroxyl, carboxyl and amino groups. The polysulfide liquid polymers may also contain terminal alkyl, aryl and other non-functional groups provided there are at least two labile hydrogen containing groups per molecule to be reactive to the isocyanate. Side mercaptan groups may occur occasionally in the chain of the repeating units and some chain segments may be cross-linked at various points. For reaction with sodium polysulfide, it is preferred to use dichloroethylformal or bis(2-chloroethylformal) as the organic dihalide although other dihalides such as ethylene dichloride, propylene dichloride, dichlorodiethyl ether and triglycol dichloride may be used alone or in mixtures to form copolymers. It is also preferred that these polysulfide liquid polymers be prepared with a small amount of a trifunctional halide such as trichloropropane, chloroform or trichloroethylene for cross-linking some of the chain segments. The polysulfide liquid polymers may be prepared by reductive cleavage of the disulfide groups of the higher molecular weight polymers to yield lower molecular weight products having thiol terminals. Thus the reaction of organic dihalide and sodium polysulfide yields a polymeric polysulfide:

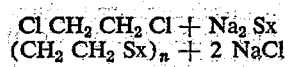

Reductive cleavage of disulfide groups depolymerizes the molecules:

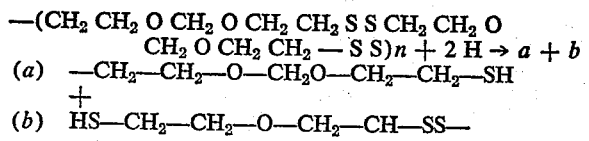

—($CH_2$ $CH_2$ O $CH_2$ O $CH_2$ $CH_2$ S S $CH_2$ $CH_2$ O $CH_2$ O $CH_2$ $CH_2$ — S S)$n$ + 2 H → $a$ + $b$ (a) —$CH_2$—$CH_2$—O—$CH_2$O—$CH_2$—$CH_2$—SH
   +
(b) HS—$CH_2$—$CH_2$—O—$CH_2$—CH—SS—

It is also possible to prepare such liquids of low molecular weight by employing a deficiency of sodium polysulfide (less than 1 mol of the polysulfide to 1 mol of the dihalide). The liquid polysulfide polymers from bis (2-chloroethylformal) and sodium polysulfide all contain the repeating unit:

[—SS $CH_2$ $CH_2$ $OCH_2$ $OCH_2$ $CH_2$ —] the terminals being thiol groups or —SH. These liquid polymers may be considered dimeric mercaptans. It is contemplated that the several polysulfide resins disclosed in United States Patent 2,466,936 and related patents, may be employed as the C Type IV resins in preparing the B resins of the invention, so long as they are liquids, that is free flowing at the temperature of the reaction, and possess terminal or included thiol groups that are reactive to the free isocyanate groups of the isocyanate resins and to the catalyst systems to be hereinafter described. The polysulfide resins suitable for incorporation in the sealants of the invention may be considered polymeric liquid polysulfides containing an average of at least two groups per molecule having isocyanate reactive hydrogens. The following is a typical preferred formulation for such a polysulfide resin:

POLYSULFIDE RESIN

|  | Mol Percent Range | | |
|---|---|---|---|
|  | Min. | Opt. | Max. |
| dichloroethyl formal | 95 | 98 | 99¾ |
| sodium tetrasulfide |  |  |  |
| trichloropropane | ¼ | 2 | 5 |

The sodium tetrasulfide may range from 25 to 95 mol percent of the dichloroethyl formal.

Other suitable polysulfide resins may be prepared in accordance with the above formulation by suitable replacement of the components within the ranges of proportions noted. Thus the dichloroethyl formal may be replaced by other dihalo compounds enumerated in the following list, provided the resultant polymer is a fluid at the temperature of catalyzing or does not remain solid at the temperature of mixing, that is from about 70 to 150° F.:

2,2 dichlorodiethyl ether
Triethyleneglycol dichloride
Dichlorodiethyl formal
Dichloropolyethylene glycol
Dichloropolypropylene glycol
Dichlorodiethyl acetal
Dichlorobutane
Dichloro diethyl ketone
Glycerol dichlorohydrin The sodium polysulfide employed in the above formulation includes sodium tetrasulfide, sodium disulfide and like compounds represented by $MaS_x$ where X is from 2 to 6 and Ma represents an alkali metal such as Na, K, Ce, Rb, or Li. The trichloropropane of the above general formulation for the preparation of polysulfide resins may be replaced by other trifunctional cross-linking halides such as carbon tetrachloride, tetrachloroethane, chloroform, etc. to form other series of useful representative polysulfide resins.

The commercial designations for the preferred polysulfide resins represented by the above general formula for such resins are: L.P. Series 2, 3, 8, 32, 33 and 38.

The molecular weights and percentages of cross-linking of these L.P. Thiokols are given in the following table:

| Type | Mol. Wt. | Percent Cross-Linking |
|---|---|---|
| L.P. 2 | 4,000 | 2 |
| L.P. 32 | 4,000 | ½ |
| L.P. 3 | 1,000 | 2 |
| L.P. 33 | 1,000 | ½ |
| L.P. 8 | 800 | 2 |
| L.P. 38 | 500–700 | ½ |

The following are typical preferred formulations for the Class C Types I, II, III and IV modifying resins for the B resins of the invention:

TYPE I (POLYESTER)

Resin—Class C, Type I(a)

|  | Mol percent range |
|---|---|
| 1,3 butylene glycol | 80–50 |
| Sebacic acid | 20–50 |
| Acid No. range | 20–150 |

Resin—Class C, Type I(b)

|  | Mol percent range |
|---|---|
| 1,4 butylene glycol | 80–50 |
| Sebacic acid (50–80 mol percent) | 20–50 |
| Azelaic acid (50–20 mol percent) |  |
| Acid No. range | 20–150 |

Resin—Class C, Type I(c)

|  | Mol percent range |
|---|---|
| 1,4 butylene glycol (99–95 mol percent) | 80–50 |
| Polypropylene glycol "4000" (1.0–5.0 mol percent) |  |
| Sebacic acid | 20–50 |
| Acid No. range | 20–150 |

Resin—Class C, Type I(d)

|  | Mol percent range |
|---|---|
| 1,4 butylene glycol (50–90 mol percent) | 80–50 |
| Polypropylene glycol (400) (10–50 mol percent) |  |
| Sebacic acid (50–90 mol percent) | 20–50 |
| Suberic acid (10–50 mol percent) |  |
| Acid No. range | 20–150 |

Resin—Class C, Type I(e)

|  | Mol percent range |
|---|---|
| 1,4 butane diol (90–98 mol percent) | 50–80 |
| 1-2-6 hexane triol (2–10 mol percent) |  |
| Sebacic acid | 50–20 |
| Acid No. range | 20–150 |

Resin—Class C, Type I(f)

|  | Mol percent range |
|---|---|
| 1,4 butane diol | 80–50 |
| Hydroxy decanoic acid | 10–25 |
| Sebacic acid | 10–25 |
| Acid No. range | 20–150 |

Resin—Class C, Type I(g)

|  | Mol percent range |
|---|---|
| Propylene glycol | 80–50 |
| Sebacic acid | 10–25 |
| Adipic acid | 10–25 |
| Acid No. range | 20–100 |

Resin—Class C, Type I(h)

|  | Percent by weight |
|---|---|
| Class C, Type I(a) | 10–80 |
| Class C, Type I(b) |  |

Resin—Class C, Type I(i)

|  | Percent by weight |
|---|---|
| Class C, Type I(d) | 10–80 |
| Class C, Type I(e) |  |

Resin—Class C, Type I(j)

| | Percent by weight |
|---|---|
| Class C, Type I(g) | } 10–80 |
| Class C, Type I(f) | |

TYPE II (POLYAMIDE)

Resin—Class C, Type II(a)

| | Mol percent range |
|---|---|
| Hexamethylene diamine | 80–50 |
| Sebacic acid | 20–50 |

Mol. wt. range 500–10,000.

TYPE III (SILICO POLYESTERS)

Resin—Class C, Type III(a)

| | Mol percent range |
|---|---|
| Dihydroxydipropylsilane | 80–50 |
| Adipic acid | 20–50 |

Mol. wt. range 500–10,000.

TYPE IV (LIQUID POLYSULFIDE RESINS)

Resin—Class C, Type IV(a)

| | |
|---|---|
| Bis (2-chloroethyl formal) | 98 mol percent range. |
| Trichloro propane | 2 mol percent range. |
| Sodium polysulfide ($Na_2S_x$) in which $x=2$–4.5 | 60–120 mol percent of the formal. |

Among the polyamides which we prefer to use as modifiers for the type B resins of the invention are the condensation reaction products between hexamethylene diamine in the mol percent of from 20 to 50. Other resins of a similar nature useful as the modifiers for the B resins may be provided by other amine homologues such as octadecyl diamine and pentamethylene diamine; furthermore acids of the type employed in the preparation of the above mentioned polyester modifiers may be employed.

The following tables indicate the proportion limitations or ranges of the components employed in the preparation of the above described resins A and B, the proportions being given in mol percent, the minimum and maximum percentages for the individual components being the quantities usable in its optimum formula to yield 100 mol percent.

A RESIN

| | Min. Mol, percent | Mols, Min. | Opt. Mol, percent | Mols, Opt. | Max. Mol, percent | Mols, Max. |
|---|---|---|---|---|---|---|
| diol alcohol | 2.5 | ¼ | 9.3 | 1 | 23.5 | 3 |
| bifunctional acid | 2.5 | ¼ | 9.3 | 1 | 23.5 | 3 |
| reticulating agent | 1.08 | ⅛ | 4.65 | ½ | 16.3 | 2 |
| diisocyanate [1] | 64.5 | 5 | 74.43 | 8 | 84.5 | 15 |
| water | 0.59 | ¹⁄₁₆ | 2.32 | ¼ | 8.7 | 1 |
| | | | 100 | 10.75 | | |

B RESIN

| | Min. Mols | Min. Mol, percent | Opt. Mols | Opt. Mol, percent | Max. Mols | Max. Mol, percent |
|---|---|---|---|---|---|---|
| diol (alcohol) | ¼ | 1.7 | 1 | 6.6 | 3 | 17.5 |
| polyester | ¼ | 1.7 | 1½ | 10.0 | 3 | 18.0 |
| reticulating agent | ⅛ | 0.84 | ⅜ | 2.4 | 2 | 12.0 |
| water | ¹⁄₁₆ | 0.42 | ¼ | 1.6 | 1 | 6.9 |
| diisocyanate [1] | 5 | 55.0 | 12 | 79.34 | 20 | 85.0 |
| | | | 15.125 | 99.94 | | |

[1] The diisocyanate may be replaced by a blend of polyisocyanates and polyisothiocyanates.

The isocyanate component of the resins of the invention are polyisocyanates and polyisothiocyanates of the general formula:

OCN—R—NCO, SCN—R—NCS, and SCN—R—NCO in which R is an intervening organic group or groups.

Examples of the suitable diisocyanates and diisothiocyanates are as follows:

2,4 toluene diisothiocyanate
Hexamethylene diisothiocyanate
2–5 naphthalene diisothiocyanate
2–4 cyclo hexylene diisothiocyanate
1, chloro 2,5 naphthalene diisothiocyanate
1,4 butane diisothiocyanate
2,4 toluene diisocyanate
2,6 toluene diisocyanate
Mixtures of 2,4 and 2,6 toluene diisocyanates
Dianisidine diisocyanate
1,4 benzene diisocyanate
p-p' diisocyanate diphenyl methane
Hexamethylene diisocyanate
1, chlorophenyl-2,4 diisocyanate
1' nitro phenyl 2,4 diisocyanate
Polymethylene diisocyanates such as trimethylene diisocyanates and pentamethylene diisocyanate
Alkylene diisocyanates such as butylene-1,2-diisocyanate and butylene 1,4 diisocyanate
Xylene diisocyanate
2–4 cyclohexylene diisocyanate
1,1 dibutyl ether diisocyanate
1,6 cyclopentane diisocyanate
2,5 indene diisocyanate
2,5 dichloro octane diisocyanate Examples of isocyanates and isothiocyanates having a functionality greater than 2 that may be used as reticulating agents in the preparation of the resins A and B of the invention include:

1,3,5, phenyl triisocyanate
2,4,6 toluene triisocyanate
1,3,6 hexamethylene triisocyanate
1,3,5 naphthalene triisocyanate
Triphenyl methane triisocyanate
1,3,5 phenyl triisothiocyanate
2,4,6 toluene triisothiocyanate
1,3,6 hexamethylene triisothiocyanate
1,3,5 naphthalene triisothiocyanate
Triphenyl methane triisothiocyanate.

Suitable polyfunctional alcohols from which the polyurethane or polythiourethane intermediates may be prepared include aliphatic diols of linear structure represented as follows:

HO—$R_1$—OH    $R_1=2$–30 ($CH_2$) units

HO—$R_2$—OH    $R_2=4$–30 $CH_2$ units
  |
  $R_3$             $R_3=1$–5 $CH_2$ units H(O—$R_4$)$_n$—OH    $R_4=1$–6 $CH_2$ units
                      $n=2$–150 units Substitution of halide, nitro, amine, keto or ether groups may occur as parts of the R groups above. Unsaturation or the occurrence of ethylenic or acetylenic linkages in the structure is also permissible.

Where polyhydric alcohols are employed as reticulating agents in the preparation of the resins of the invention it is required that three or more functional hydroxy groups be present. These structures are analogous to those of the diols except that methylene hydrogen atoms are replaced by hydroxy groups. The aliphatic polyhydric alcohols employed may contain aromatic, alicyclic or heterocyclic groups provided that no more than one is employed per molecule unit.

Polyols such as dihydric alcohols, glycols, polyglycols, and blends of the same are suitable as reactant diols in the preparation of the A and B resins of the invention. It is preferred to use glycols or low molecular weight diols (molecular weight not greater than 400) in combination with polyglycols such as polypropylene glycol, polyethylene glycol, and polybutylene glycol having an average molecular weight in the range between 400 and 10,000. In blends of the low molecular weight glycol and polyglycols there should be no more than 20 mol percent of the glycol. Typical examples of the polyols which we prefer to employ as reactants with the polyisocyanates and polyisothiocyanates and their blends are:

1,4 butane diol
2 methyl butane diol 1,4
Hexanediol
Polypropylene glycol 3000
Polypropylene glycol 4000
Polypropylene glycol 1000
Polypropylene glycol 10,000
Butynediol
1,3 propylene glycol.

Polyhydric alcohols having a funtionality greater than 2 may be employed as reticulating agents for the resins of the invention. Such polyhydric alcohols include glycerol, polyglycerol, diglycerol, mannitol, sorbitol, pentaerythritol, dipentaerythritol, 1-2-6 hexanetriol, 1-2-4 butanetriol. If polyhydric alcohols having a functionality greater than 3 are employed they must be used in blends with triols in proportions where the triol is not less than 50 mol percent of the blend employed as a reticulating agent.

Polyfunctional alkylorganic acids suitable for reaction during the second stage of the preparation of the A resins are substituted, unsubstituted, saturated or unsaturated and may include polycarboxylic types having a molecular weight range of from 90 to 800 and polyhydroxy carboxylic types having a molecular weight range of from 75 to 800. Suitable carboxylic types of such acids include malonic, succinic, sebacic, adipic, pimelic and azelaic while suitable polyhydroxy carboxylic acids include 1-hydroxy decanoic acid, ricinoleic acid and glycolic acid. The use of polyfunctional acids as reticulating agents requires that three or more functional groups with regard to labile hydrogen be present in their respective molecules. Typical examples include tartaric acid; 1,2 dihydroxy 1, butanoic acid; butane tetracarboxylic acid; 1,2,6 hexane trioic acid; 1-hydroxy, 3-amino, 5-pentanoic acid; and ethylene diamine tetraacetic acid.

The following formulations of Examples 1 to 15 inclusive are typical preferred examples of the Type A resins of the invention, while the following Examples 16 to 31 inclusive are typical preferred formulations of the Type B resins, which latter include a third or "C" Class in their compositions. In these several examples the constitutents or ingredients are in mol percentages.

RESIN 1

[Amine equivalent 500–700]

| | Mol percent |
|---|---|
| 2,4 toluene diisocyanate | 74.43 |
| Polypropylene glycol (avg. mol. wt. 3000) | 9.30 |
| Ricinoleic acid | 9.30 |
| Water | 2.32 |
| 1,2,6 hexanetriol (range 2–8 mol percent) | 4.65 |

RESIN 2

[Amine equivalent 500–600]

| | Mol percent |
|---|---|
| 2,4 toluene diisocyanate (60–90 mol percent) | } 74.43 |
| 2,6 toluene diisocyanate | |
| Hydroxy decanoic acid | 9.30 |
| Water (range 2–4 mol percent) | 2.32 |
| Trimethylol propane | 4.65 |
| Polypropylene glycol (avg. mol. wt. 10,000) | 9.30 |

RESIN 3

[Amine equivalent 450–500]

| | Mol percent |
|---|---|
| 2,4 toluene diisocyanate (60–90 mol percent) | } 74.43 |
| Hexamethylene diisocyanate | |
| Sebacic acid | 9.30 |
| Hexamethylene glycol (5–15 mol percent) | 9.30 |
| Polypropylene glycol 3000 | |
| Water | 2.32 |
| 1-2-6 hexane triol (range 1–8 mol percent) | 4.65 |

RESIN 4

[Amine equivalent 400–500]

| | Mol percent |
|---|---|
| 2,4 phenyldiisocyanate (70–80 mol percent) | } 74.43 |
| 1,4 phenyldiisocyanate | |
| Polyethylene glycol (avg. mol. wt. 600) | 9.30 |
| Pentaerythritol | } 4.65 |
| 1,2,6 hexanetriol (50–90 mol percent) | |
| Ricinoleic acid (50–90 mol percent) | } 9.30 |
| Lactic acid | |
| Water | 2.32 |

RESIN 5

[Amine equivalent 400–600]

| | Mol percent |
|---|---|
| Meta toluene diisocyanate | } 74.43 |
| Dianisidine diisocyanate (1–5 mol percent) | |
| Polypropylene glycol (avg. mol. wt. 3000) | } 9.30 |
| Dihydroxydiethylsilane (1–5 mol percent) | |
| Ricinoleic acid | } 9.30 |
| Hydroxyacetic acid (6–18 mol percent) | |
| Glycerol | 4.65 |
| Water | 2.32 |

RESIN 6

[Amine equivalent 500–600]

| | Mol percent |
|---|---|
| p,p′ Diphenyldiisocyanate (1–5 mol percent) | } 74.43 |
| 2,6 meta toluene diisocyanate | |
| Butynediol (1–15 mol percent) | } 9.30 |
| Polypropylene glycol (avg. mol. wt. 2000) | |
| Alphahydroxy decanoic acid | 9.30 |
| Mannitol | 4.65 |
| Water | 2.32 |

RESIN 7

[Amine equivalent 300–600]

| | Mol percent |
|---|---|
| Diethylsilane diisocyanate (1–10 mol percent) | } 74.43 |
| 2-4 meta toluene diisocyanate | |
| 2,4 dichloro 1,4 butanediol | } 9.30 |
| Polypropylene glycol (avg. mol. wt. 4000) (50–90 mol percent) | |
| 1,2,6 hexanetriol | 4.65 |
| Adipic acid | } 9.30 |
| Butane tetracarboxylic acid (2–8 mol percent) | |
| Water | 2.32 |

RESIN 8

[Amine equivalent 400–600]

| | Mol percent |
|---|---|
| 2,4 meta toluene diisocyanate | } 74.43 |
| Methylsilane triisocyanate (1–2 mol percent) | |
| β chloropolypropylene glycol (avg. mol. wt. 2000) | 9.30 |
| Octadecadienedioic acid | 9.30 |
| 1,2,6 hexane triol | 4.65 |
| Water | 2.32 |

RESIN 9

[Amine equivalent 500–600]

| | Mol percent |
|---|---|
| 6-nitro 2-4 toluene diisocyanate | 74.43 |
| 2,6 toluene diisocyanate (80–90 mol percent) | |
| Amino ethanol | |
| Polypropylene glycol (avg. mol. wt. 3000) (80–90 mol percent) | 9.30 |
| Water | 2.32 |
| Triethanolamine | 4.65 |
| Ricinoleic acid | 9.30 |
| 2-hydroxy malic acid (1–10 mol percent) | |

RESIN 10

[Amine equivalent 400–500]

| | Mol percent |
|---|---|
| 2,4 toluene diisocyanate | 74.43 |
| Polybutylene glycol (avg. mol. wt. 3000)[1] | 9.30 |
| Ricinoleic acid | |
| Tartaric acid (1–5 mol percent) | 9.30 |
| 1,2,6 hexanetriol | |
| Diethylene triamine (1–5 mol percent) | 4.65 |
| Water | 2.32 |

[1] Range, 4–10 mol percent.

RESIN 11

[Amine equivalent 300–600]

| | Mol percent |
|---|---|
| 2,4 toluene diisocyanate | 74.43 |
| Polypropylene glycol (avg. mol. wt. 5000)[1] | 9.30 |
| Ricinoleic acid | 9.30 |
| Water | 2.32 |
| 1,2,6 hexanetriol | 4.65 |

[1] Range, 4–15 mol percent.

RESIN 12

[Amine equivalent 300–600]

| | Mol percent |
|---|---|
| 2,4 toluene diisocyanate | 74.43 |
| Polybutylene glycol (avg. mol. wt. 2000)[1] | 9.30 |
| Ricinoleic acid | 9.30 |
| Water | 2.32 |
| 1,2,6 hexanetriol | 4.65 |

[1] Range, 4–20 mol percent.

RESIN 13

[Amine equivalent 300–600]

| | Mol percent |
|---|---|
| 2,4 toluene diisocyanate | 74.43 |
| Polyethylene glycol (avg. mol. wt. 1000)[1] | 9.30 |
| Ricinoleic acid | 9.30 |
| Water | 2.32 |
| 1,2,6 hexanetriol | 4.65 |

[1] Range, 4–20 mol percent.

RESIN 14

[Amine equivalent 400–700]

| | Mol percent |
|---|---|
| Meta toluene diisocyanate | 74.43 |
| Polypropylene glycol (avg. mol. wt. 4000)[1] | 9.30 |
| Water | 2.32 |
| 1,2,6 hexanetriol | 4.65 |
| Hydroxy propionic acid | 9.30 |

[1] Range, 2–15 mol percent.

RESIN 15

[Amine equivalent 200–400]

| | Mol percent |
|---|---|
| 2,4 toluenediisocyanate[1] | 79.40 |
| Polypropyleneglycol (avg. mol. wt. 3000) | 6.60 |
| Resin Class C Type I-a (acid No. 100–150)[1] | 10.00 |
| 1,2,6 hexanetriol | 2.40 |
| Water | 1.60 |

[1] Range, 1–10% neutralization equivalent of resin taken as mol. wt. Type I-b, c, d, e, f, may be substituted for Type I-a.

RESIN 16

[Amine equivalent 200–400]

| | Mol percent |
|---|---|
| 2,4 toluene diisocyanate | 79.40 |
| 2,6 toluene diisothiocyanate (1–10 mol percent) | |
| Polypropyleneglycol (avg. mol. wt. 1000) | 6.60 |
| Resin Class C Type I-a (acid no. 50–100) | [1]10.00 |
| Trimethylol propane | 2.40 |
| Water | [2]1.60 |

[1] Range, 1–10% neutralization equivalent of resin taken as mol. wt. Type I-b through f resins may be substituted for I-a.
[2] Range, 2–4 mol percent.

RESIN 17

[Amine equivalent 200–300]

| | Mol percent |
|---|---|
| 2,4 toluene diisocyanate | 79.40 |
| Hexamethylene diisocyanate (10–20 mol percent) | |
| Resin Class C Type II-a (mol. wt. 1000–2000) | [1]10.00 |
| Water | 1.60 |
| 1,2,6 hexanetriol | [2]2.40 |
| Hexamethylene glycol (10–30 mol percent) | 6.60 |
| Polypropyleneglycol (avg. mol. wt. 3000) | |

[1] Range, 1–10% neutralization equivalent of resin taken as mol. wt.
[2] Range, 1–5 mol percent.

RESIN 18

[Amine equivalent 300–400]

| | Mol percent |
|---|---|
| 2,4 phenyl diisocyanate (10–50 mol percent) | [1]79.4 |
| 2,4 toluene diisocyanate | |
| Polypropylene glycol (avg. mol. wt. 10,000) | 6.6 |
| Resin Class C Type II-b (mol. wt. 1500) (5–10 mol percent) | 10.0 |
| Resin Class C Type I-a (acid no. 50)[2] | |
| Pentaerythritol (5–10 mol percent) | 2.4 |
| 1,2,6 hexanetriol | |
| Water | 1.6 |

[1] Range, 60–85 mol percent.
[2] Mol percent is considered as 1–10% of the neutralization equivalent.

RESIN 19

[Amine equivalent 300–400]

| | Mol percent |
|---|---|
| 2,4 toluene diisocyanate (10–50 mol percent) | 79.4 |
| Hexamethylene diisocyanate | |
| Dihydroxydiethylsilane (1–5 mol percent) | 6.6 |
| Polypropylene glycol (avg. mol. wt. 2000) | |
| Resin Class C Type III-a | 10.0 |
| Glycerol | 2.4 |
| Water | 1.6 |

RESIN 20

[Amine equivalent 200–400]

| | Mol percent |
|---|---|
| 2,6 toluene diisocyanate (10–50 mol percent) | 79.4 |
| p,p' diphenyl diisocyanate | |
| Polypropylene glycol (avg. mol. wt. 4000) | 6.6 |
| Resin Class C Type I-a (acid no. 50–100)[1] | |
| Resin Class C Type II-a (mol. wt. 900–1500) (1–10 mol percent) | 10.0 |
| Resin Class C Type III-a (mol. wt. 2000–4000) (1–10 mol percent) | |
| Mannitol (1–10 mol percent) | 2.4 |
| Hexanetriol | |
| Water | 1.6 |

[1] Mol percent taken as 1–10% of the neutralization equivalent.

RESIN 21

[Amine equivalent 300–400]

| | Mol percent |
|---|---|
| 2,4 toluene diisocyanate | } 79.4 |
| Diethylsilane diisocyanate (10–30 mol percent) | |
| Polypropylene glycol (avg. mol. wt. 5000) | } 6.6 |
| 2,4 dichloro 1,4 butanediol (10–30 mol percent) | |
| Water | 1.6 |
| Resin Class C Type IV-a (mol. wt. 500–2000) | 10.6 |
| Ethyl silane triisocyanate (10–20 mol percent) | } 12.4 |
| 1,2,6 hexanetriol | |

[1] Range, ½–5 mol percent.

RESIN 22

[Amine equivalent 200–500]

| | Mol percent |
|---|---|
| 2,4 toluene diisocyanate | 79.4 |
| Resin Class C Type I-a (acid no. 3–60) | [1] 10.0 |
| Polybutylene glycol (avg. mol. wt. 2000) | } 6.6 |
| Chloropolypropylene glycol (avg. mol. wt. 1000) (10–50 mol percent) | |
| Water | 1.6 |
| Butane tetracarboxylic acid (1–10 mol percent) | } 2.4 |
| Glycerol | |

[1] Mol percent is taken as 1–15% of the neutralization equivalent.
[2] Range may be 1–5 mol percent.

RESIN 23

[Amine equivalent 200–300]

| | Mol percent |
|---|---|
| 6-nitro-2,4, toluene diisocyanate (10–30 mol percent) | } 79.4 |
| 2,6 toluene diisocyanate | |
| Aminoethanol (1–10 mol percent) | } 6.6 |
| Polypropylene glycol (avg. mol. wt. 2500) | |
| Resin Class C Type II-a (mol. wt. 4000–5000) | 10.0 |
| Water | 1.6 |
| Triethanolamine (1–5 mol percent) | } 2.4 |
| 1,2,6 hexanetriol | |

RESIN 24

[Amine equivalent 200–500]

| | Mol percent |
|---|---|
| 2,4 toluene diisocyanate | [1] 79.4 |
| Resin Class C Type I-a (acid no. 50–200) | [2] 10.0 |
| Polybutylene glycol (avg. mol. wt. 2000) | 6.6 |
| 1,2,6 hexylene triamine (1–5 mol percent) | } 2.4 |
| 1,2,6 hexanetriol | |
| Water | 1.6 |

[1] Range, 65–85 mol percent.
[2] Mol percent is used as 1–15% of the neutralization equivalent.

RESIN 25

[Amine equivalent 300–600]

| | Mol percent |
|---|---|
| 2,4 toluene diisocyanate | 79.4 |
| Resin Class C Type I-b (acid no. 0.5–10) | [1] 10.0 |
| Polypropylene glycol (avg. mol. wt. 3000) | [2] 6.6 |
| 1,2,6 hexane triol | 2.4 |
| Water | 1.6 |

[1] Mol percent is used as 1–15% of the neutralization equivalent. I-c through j may be used in place of I-b.
[2] Range, 4 to 10 mol percent.

RESIN 26

[Amine equivalent 300–500]

| | Mol percent |
|---|---|
| 2,4 toluene diisocyanate | 79.4 |
| Resin Class C Type I-c | [1] 10.0 |
| Polypropylene glycol (avg. mol. wt. 2000) | 6.6 |
| 1,2,6 hexane triol | [2] 2.4 |
| Water | 1.6 |

[1] Mol percent is taken as 1–15% of neutralization equivalent.
I-c may be replaced by I-d through j.
[2] Range, ½–5 mol percent.

RESIN 27

[Amine equivalent 250–500]

| | Mol percent |
|---|---|
| 2,4 toluene diisocyanate | 79.4 |
| Resin Class C Type I-d (acid no. 10–100) | [1] 10.0 |
| Polypropylene glycol (avg. mol. wt. 4000) | 6.6 |
| 1,2,4 butanetriol | 2.4 |
| Water | [2] 1.6 |

[1] Mol percent is taken as 1–15% of the neutralization equivalent.
Type I-d may be replaced by I-e through j.
[2] Range, ⅛–2 mol percent.

RESIN 28

[Amine equivalent 300–400]

| | Mol percent |
|---|---|
| 2,4 toluene diisocyanate | 79.4 |
| Resin Class C Type I-e (acid no. 10–100) | [1] 10.0 |
| Polypropylene glycol (avg. mol. wt. 2500) | [2] 6.6 |
| 1,2,6 hexanetriol | 2.4 |
| Water | 1.6 |

[1] Mol percent is taken as 1–15% of the neutralization equivalent.
Type I-e may be replaced by I-f through j.
[2] Range, 5–10 mol percent.

RESIN 29

[Amine equivalent 200–400]

| | Mol percent |
|---|---|
| 2,4 toluene diisocyanate | } 79.4 |
| 2,4 phenyl diisothiocyanate (1–5 mol percent) | |
| Resin Class C Type I-f (acid no. 1–5.0) | [1] 10.0 |
| Polypropylene glycol (avg. mol. wt. 5000) | 6.6 |
| 1,2,6 hexanetriol | [2] 2.4 |
| Water | 1.6 |

[1] Mol percent is taken as 1–15% of the neutralization equivalent.
Type I-f may be replaced by I-g through j.
[2] Range, ¼–5 mol percent.

RESIN 30

[Amine equivalent 300–400]

| | Mol percent |
|---|---|
| 2,4 toluene diisocyanate | 79.4 |
| Resin Class C Type I-g (acid no. 5–50) | [1] 10.0 |
| Polypropylene glycol (avg. mol. wt. 2000) | 6.6 |
| Water | 1.6 |
| 1,2,6 hexanetriol | 2.4 |

[1] Mol percent is taken as 8–12% of the neutralization equivalent.
Type I-g may be replaced by I-h, I-i, and I-j.

RESIN 31

[Amine equivalent 300–400]

| | Mol percent |
|---|---|
| 2,4 toluene diisocyanate | } 79.4 |
| 2,4 phenyl diisothiocyanate (1–10 mol percent) | |
| Resin Class C Type I-h (1–10 mol percent) | } [1] 10.0 |
| Resin Class C Type I-a | |
| Polypropylene glycol (avg. mol. wt. 1000) | } 6.6 |
| Polypropylene glycol (avg. mol. wt. 5000) (10–50 mol percent) | |
| Water | 1.6 |
| 1,2,6 hexanetriol | } 2.4 |
| Mannitol (1–5 mol percent) | |

[1] Mol percent is taken as 7–15% of the neutralization equivalent.
Type I-h may be replaced by I-i, I-j.

Molecular weight determinations of resins Class C Type I-a through j yield values ranging from 500-upwards to superpolymers of many thousands. We prefer to use a neutralization equivalent value determined from the acid number and defined as the number of grams of resin equivalent to one gram mol (or 56.1 grams) of KOH. Acid number of the resin is taken as the number of milligrams of potassium hydroxide required for the neutralization of 1 gram of resin.

The average molecular weight of the polyglycols used in our above examples or formulations may range from 300 to 10,000 and is preferably between 1,000 and 5,000. Blends of polyglycols of different average molecular weights may also be employed effectively in the resinous compositions. Polyethyleneglycols and polypropyleneglycols are commercially available in selected average molecular weights but containing factors or portions varying in molecular composition and it will usually be preferred to employ such commercial products although, of course, polyglycols each having a single molecular weight or a single range of molecular weights in their composition may be used individually or in blends as desired. Accordingly, where the expression "average molecular weight" is employed in the above examples, it is intended to mean the average molecular weight of the polyethylene glycols or polypropylene glycols as commercially available and containing factors or portions varying in molecular composition although, as just noted, polyglycols each having a single molecular weight or a single range of molecular weights may, if desired, be employed in the preparation of the resins of the invention.

The following is a reaction chart for preparing a typical A Resin such as above described. The synthesizing of the resin should be carried out in a glass-lined reactor, a stainless steel reactor, or the like, and the temperatures, as well as the reaction times should be controlled. The time sequences will, of course, vary with the size of the batch or run and the tailoring of the final resin to the desired or specified amine equivalent. The following chart covers the preparation of a pilot run in which approximately 1 gallon of the resin is produced, it being understood that the components referred to in the chart are merely illustrative of this type of resin.

PHASE I

| Total Elapsed Time | Temperature, °F. | Amine Equiv. | Order of Component Addition To Reactor |
|---|---|---|---|
| 0 | 70 | | Isocyanate added. |
| 0 | 70 | | Diol added. |
| 20 | 150 | | Diol addition complete. |
| 40 | 150 | | Polyurethane reaction complete. |

PHASE II

| | | | |
|---|---|---|---|
| 40 | 150 | | Difunctional acid added. |
| 90 | 150 | | Water added. |
| 100 | 150 | | Reaction finished. |

PHASE III

| | | | |
|---|---|---|---|
| 100 | 150 | | Reticulating agent added. |
| 105 | 150 | | Reticulating agent addition complete. |
| 135 | 150 | | |
| 145 | 250 | | |
| 165 | 250 | | Reaction finished. |
| 200 | 70 | 550 | (cooling period). |

The following chart or schedule illustrates the preferred sequence of adding or incorporating typical components in preparing a Type B Resin relative to the temperatures, timing, etc. The above comments concerning the preparation of the A Resins are applicable to the synthesizing of the B Resins.

PHASE I

| Time | Temperature, °F. | Component Added |
|---|---|---|
| 0 | 70 | meta toluene diisocyanate. |
| 0 | 70 | polypropylene glycol water mixture. |
| 20 | 200 | polypropylene glycol addition finished. |
| 50 | 200 | reaction time. |

PHASE II

| | | |
|---|---|---|
| 90 | 200 | a Class C Type I-a polyester resin added. |

PHASE III

| | | |
|---|---|---|
| 100 | 200 | 1,2,6 hexane triol added. |
| 110 | 260 | 1,2,6 hexane triol all in. |
| 125 | 260 | final reaction amine equivalent 308. |

The resins of the invention represented by the above resins 1 to 31 inclusive, and their blends, are well suited as film forming and coating resins. We have found that thin layers of less than 1 mil and up to 100 mils thickness are easily provided with these resins without the use of catalysts, oxygen, or drier activators. The resinous materials may be directly bladed onto a surface to provide thin films of the desired thickness, may be sprayed from a suitable solvent solution or may be brushed, dipped, calendered or spattered and, of course, may be applied to practically any material such as metal, wood, cloth, glass, plastic, etc. The adhesion of the resultant films to fabrics, wood and various porous and semi-porous surfaces is excellent. Where the coatings are to be applied to smooth metal surfaces it is desirable to first apply a primer to obtain maximum adhesion. It has been found that coatings of the resins are relatively non-crazing to acrylic and styrene plastics and, therefore, are well suited for protecting these materials. The resins, when applied as above described, or when otherwise applied to form films or coatings, function as room temperature air cure coatings due to their structure which enables them to react with the moisture of the air and thus polymerize into tough, resilient elastic coatings that are transparent or semi-transparent unless pigments or other modifiers are employed.

As already noted, the resins of the invention are suitable for use in the 100% solids resin content state as surface coating materials, film forming materials, etc. or may be employed in solvent-resin combinations. In the latter case the solvents serve primarily to control or facilitate application. It is preferred to employ polar solvents such as ketones (primarily aliphatic), methyl ethyl ketone, methyl isobutyl ketone, acetone, and the like. It is desirable to employ solvents that have no labile hydrogen atoms capable of reacting with the functional groups of the resinous compounds responsible for the curing of the films or coatings.

The resins, Resins 1 to 31 inclusive, are well suited for forming thin plastic films resembling cellophane, saran, etc. and as impregnating resinous materials. When used to form plastic films the resins may be applied directly in thin films by means of rolls, by spraying, brushing, dipping, blading, or by similar procedures. The films air cure at room temperatures and when cured may be stripped from the mandrel or other surface to which they have been applied. The resins, when applied in a suitable manner, are effective as protective coatings for metals, wood, plastic, paper, etc., as impregnating materials for fabrics, screens, paper, and the like, as moisture-proof coatings for moisture absorbent or moisture sensitive materials, and lacquers, paints, primers, and the like, may be prepared or fabricated from the resins. When the resinous materials of the invention are to be employed in the manufacture of films or as impregnating materials, they may be suitably modified by the addition of plasticizers such as dioctyl phthalate, dibutyl sebacate, tricresyl phosphate, and di 2-ethyl hexyl adipate and, of course, appropriate pigments may be incorporated such as graphite, carbon black, aluminum powder, and the like.

The modifiers for the resins such as the plasticizers and pigments may be milled directly into the resins if desired. The coating and film forming resins, with or without modification, cure by contact with the air at room temperature and at a relative humidity of from 20 to 98%, the resins polymerizing due to their reaction with the moisture in the atmosphere.

The following carriers, thinners, or solvents, may be used to obtain solutions of the resins of the invention of the desired consistencies:

Ketones, such as methyl ethyl ketone, di methyl ketone, methyl propyl ketone, and methyl isobutyl ketone;

Esters such as ethyl acetate, methyl propionate and amyl acetate;

Ethers such as ethyl amyl ether, ethyl propyl ether, and 1,1 di chloro dipropyl ether; and Alkyl or aryl halides such as trichloropropane, tetrachloro ethane and monochlorobenzene.

Each of Resins 1 to 31 inclusive, employed individually or in suitable blends, are effective as coating compositions, impregnating compositions, plastic film forming compositions and for analagous purposes. A typical illustrative material may be prepared from Resin 15 and methyl ethyl ketone in a 90–10% by weight blend respectively to constitute a suitable and effective readily applied coating material. In such a material the methyl ethyl ketone may be replaced by acetone, ethylene dichloride or methyl propyl ketone. Where a loaded or pigmented product such as a coating material is desired, one of the resins, for example, Resin 28 and graphite, or other pigment, in a 90–10% by weight mixture is effective. The graphite may be replaced in whole or in part by carbon black, silica, or aluminum powder, and used with other resins. Resin 1, thinned with from 5 to 95% by weight of methyl ethyl ketone, or any of the other above described solvents or thinners, has been found to be effective as a coating, impregnating material, etc. and any of Resins 1 to 31 inclusive mixed with methyl ethyl ketone or other similar thinner or solvent are likewise effective.

Caulking materials, sealants and the like prepared from liquid polysulfide polymers, previously described, are found to be water sensitive to varying degrees. This water sensitivity may be ascribed to the thiol groups present in the polysulfide molecule. On the other hand, it has been found difficult to cast polyisocyanate resins in thick sections without the formation of voids. We have found that fluid resin reaction products of polyisocyanates, polyisothiocyanates and their blends, such as previously described, compounded with polymeric polysulfides containing an average of at least 2 labile hydrogen atoms per molecule, which are reactive to isocyanates, suitably catalyzed, are effective as sealants, caulking materials, putties, etc. capable of being used or cast in thick sections without the formation of voids and are tough, rubbery, adherent, water and fuel resistant and retain their desirable physical characteristics at low temperatures. Thus, sealants, and the like, prepared from the derived polymers and copolymers of polyisocyanates, polyisothiocyanates, and their blends, and the polysulfide resins do not have the disadvantages of low water resistance, void formation, etc. above mentioned, but do possess the desirable characteristics of toughness, elasticity, low temperature flexibility, adherence, etc. The sealants of the invention possessing these physical characteristics are useful as fuel tank sealants, aircraft cabin sealants, low temperatuer caulking materials, oil and grease gasketing materials, marine caulking materials, window glazing materials, etc.

Sealants, caulking compounds and putties of the invention comprise compositions prepared from one or more of the liquid polysulfides (Thiokols), one or more of the liquid polyisocyanate resins, 1 to 20 inclusive, and 22 to 31 inclusive, and preferably a catalyst system for accelerating the cure. The desirable physical characteristics of the applied or resultant sealants result in part from the reaction of the labile hydrogens of the polysulfide resins with the free isocyanate or free isothiocyanate or blends of the polyisocyanate or isothiocyanate resins. Additional curing is effected by the action of atmospheric moisture on the isocyanate containing resin, acting as a chain lengthening and cross-linking agent by water which is released due to oxidation of the polysulfide mercaptan groups and by the formation of metallic mercaptides, the exact nature of the cure being, of course, a function of the particular sealant composition. We have found that sealants, caulking compounds, and the like, derived from the simple combination of the uncatalyzed liquid polysulfide resins and the uncatalyzed liquid polyisocyanate resins, both previously described, are slow setting, soft or semi-fluid, and only partially set. While such materials are adapted for specific uses or applications requiring very soft sealants, it is usually preferred for most applications to employ sealants that cure more rapidly and that harden to a greater extent. We have provided catalyst means for controlling or accelerating the curing rate of the mixed polymers. It will usually be preferred to provide a catalyst or accelerator for each resin component of the sealant. Thus the catalyst for the polysulfide resin component may be mixed with the polyisocyanate resin to form a package-stable unit or material while the catalyst for the isocyanate polymer may be packaged in the polysulfide resin to likewise form a package-stable component. Subsequent mixing of these two units or components provides for the accelerated final cure of the blended polymers.

We have discovered dual or double catalyst systems for effectively controlling the reaction of these groups of the two types of resin components to produce satisfactory and reproducible final cure mechanisms and characteristics. The catalysts for the isocyanate class resins serve as activators for the peroxide catalysts for the polysulfide resin polymerization. Thus, it is a feature of the invention to provide dual acting catalysts used in various selected combinations with the blends or mixtures of anhydrous polyisocyanate resins (and polyisothiocyanate-isocyanate resins) and anhydrous and nearly anhydrous polysulfide resins to produce void free sealants having the desirable physical characteristics of flexibility, resiliency, adherence, low temperature flexibility, etc.

The catalysts for the polyisocyanate type resins, that is the catalysts that may or may not be initially mixed or packaged with the polysulfide resins are preferably heterocyclic nitrogen base compositions. The nitrogen base polyisocyanate catalysts are chosen so as to be compatible with the peroxides of the polysulfide catalysts. Typical of these preferred catalysts are:

(1) Quinoline
(2) Melamine
(3) Morpholine
(4) Methylmorpholine
(5) Thialdine
(6) N-hydroxyethylmorpholine
(7) N-hydroxy butylmorpholine
(8) Pyridine
(9) Triethyl amine
(10) Triethanol amine
(11) Tributyl amine
(12) Hydroxylamine Mixtures or blends of these catalysts are useful in obtaining appropriate catalyst components. Blends with other nitrogen base compounds are also useable. The following are illustrative examples of blends or mixtures of the catalysts:

*Catalyst 9*

| | Percent by weight |
|---|---|
| Triethanolamine | 50 |
| Hydrazine | 50 |

In this catalyst formulation the hydrazene may be employed in the proportion range of from 1 to 60% by weight, the balance being the triethanolamine.

*Catalyst 10*

| | Percent by weight |
|---|---|
| Tributylamine | 50 |
| N-methylmorpholine | 50 |

In Catalyst 10 the N-methylmorpholine may be used in the proportion range of from 1 to 60% by weight, the balance being the tributylamine.

*Catalyst 11*

| | Percent |
|---|---|
| N-hydroxyethylmorpholine | 10 |
| Tri-ethanolamine | 90 |

In this formulation the N-hydroxyethylmorpholine may be employed in the proportion of from 1 to 15%, the balance being the tri-ethanolamine.

The catalyst or catalysts for the polyisocyanate type resins are employed in the proportion of from 5 to 95% by weight of the total catalysts, the total weight of all of the catalysts being from 0.1 to 20% by weight of the total mix or product.

The catalysts for the polysulfide resins serve to initiate oxidative reaction of the polysulfide linkage or sulfhydryl group. We herein disclose several suitable types of these catalysts, the same being identified as Classes A, B, C and D. The following organic peroxides are in the preferred Class A:

Tertiary butyl hydroperoxide
  Cumene hydroperoxide
  Urea peroxide
  Acetyl peroxide
  Di-ter-butyl peroxide
  1-hydroxy cyclohexyl hydroperoxide
  t-Butyl perbenzoate The Class B catalysts for the polysulfide resins are inorganic peroxides represented by the following:

Sodium carbonate peroxide
  Magnesium peroxide
  Zinc peroxide
  Lead peroxide
  Calcium peroxide
  Sodium pyrophosphate peroxide
  Barium peroxide
  Sodium peroxide The Class C catalysts for the polysulfide resins are alkaline oxides and metals represented by:

Zinc oxide
  Cadmium oxide
  Mercury oxide

The catalysts of Classes A and B may, if desired, be used in conjunction with accelerators such as metal soaps, amines, or the following which are herein referred to as Class D catalysts:

Diphenyl guanidine
Hexamethylene tetramine
Metal driers such as:
  Cobalt naphthenates and
  Zinc octoate
Zinc stearate
Aluminum stearate
Diphenyl guanidine phthalate
P-quinone dioxine As above described, it may be preferred to incorporate the catalyst or catalyst blend for the polysulfide resin in the isocyanate resin component and to incorporate the catalyst or catalyst blend for the isocyanate type resin component in the polysulfide resin component.

Of course the several ingredients or components may be supplied individually and simply mixed together in an appropriate manner and in the selected or required proportions, the Resin A or B, or blends thereof being pre-prepared and the Thiokol or polysulfide resin likewise being pre-prepared.

Thus the two resin components may be prepared and packaged separately and if desired the two catalysts may likewise be each prepared and separately packaged, for mixing prior to use of the sealant. The catalysts, that is the total of the catalyst (dual) components preferably comprises from one-tenth to 20% by weight of the total resins. The catalyst system contains an activator or catalyst for each resin component in the proportion of at least 5% by weight of the total catalyst with the possible addition of from 0.01 to 10% to the selected polysulfide resin Catalyst A, B, or C of a rate control agent D. In this connection it may be noted that where a C class catalyst is employed it is desirable or important to also include a D type catalyst in the proportion of from at least 1% to not more than 50% of the total of catalysts C and D. The Class A and Class B catalysts may be used individually or may be used in blends in any selected ratios or, if desired, in combination with a D class catalyst where the D catalyst is employed in the amount of not more than 10% by weight of the catalyst mixture. The catalysts, that is the catalyst for the polyisocyanate or polyisothiocyanate-isocyanate resin component and the catalyst for the polysulfide resin are employed in the proportion of from $\frac{1}{10}$th to 20% by weight of the total resins.

The polysulfide resin component is employed in the proportion of from 5 to 95% by weight of the total weight of the resins and the polyisocyanate or polyisothiocyanate-isocyanate resin component is employed in the proportion of from 5 to 95% by weight of the total weight of the resins.

Suitable or appropriate modifiers such as fillers, coloring materials and plasticizers may be incorporated in the materials or products of the invention. The fillers or reinforcing agents that may be used include talc, mica, silica, asbestos, carbon black, rayon flock, mineral fillers, fibers, materals. The coloring ingredients may be organic dyes such as Sudan Red, Malachite Green, etc. or inorganic pigments such as the various iron oxides or the chrome yellows such as zinc chromate, lead chromate, etc. The plasticizers that may be included in the formulations in an amount up to 20% by weight of the total include chlorinated biphenyl resins containing from 10 to 30% chlorine, diesters such as dioctyl sebacate, esteramides, silicones, and diesters of polyglycols such as diethylene glycol dihexoate.

The following are typical preferred examples of the formulations for the sealants, caulking compounds, etc. of the invention:

EXAMPLE 1

| | Percent |
|---|---|
| Polysulfide resin LP2 mol. wt. 4000, 25% | |
| Polysulfide resin LP8 mol. wt. 300, 25% | 98 |
| Resin No. 1, amine equivalent 400, 50% | |
| Tertiary butyl hydroperoxide, 50% | 2 |
| Catalyst No. 2, 50% | |

In Example 1, Catalysts 1, 3 or 4, or blends thereof, may be substituted for the Catalyst 2.

EXAMPLE 2

| | Percent |
|---|---|
| Polysulfide Resin LP8, mol. wt. 300, 75% | 95 |
| Resin No. 2, amine equivalent 350, 25% | |
| Urea peroxide, 25% | 5 |
| Catalyst No. 5, 75% | |

In Example 2, Catalysts 6, 7, 8, or blends of the same, may replace Catalyst 5.

EXAMPLE 3

| | Percent |
|---|---|
| Polysulfide Resin LP3, mol. wt. 1000, 60% | 97 |
| Resin No. 4, amine equivalent 450, 40% | |
| Lead peroxide, 30% | 3 |
| Catalyst No. 6, 70% | |

In Example 3, Resins 5 or 7, or blends of the same, may replace Resin 4.

EXAMPLE 4

| | Percent |
|---|---|
| Polysulfide Resin LP33, mol. wt. 1000, 40% | 95 |
| Resin No. 11, amine equivalent 500, 60% | |
| Sodium carbonate peroxide 40% | 5 |
| Catalyst No. 4, 60% | |

In Example 4, Resins 8, 9 or 10, or blends of the same, may replace Resin 11.

EXAMPLE 5

| | Percent |
|---|---|
| Polysulfide Resin LP32, mol. wt. 800, 50% | } 90 |
| Resin No. 15, amine equivalent 300, 50% | |
| Sodium pyrophosphate peroxide, 30% | } 10 |
| Catalyst No. 6, 60% | |

Resins 17, 18 or 19, or their blends, may replace Resin 15 in Example 5.

EXAMPLE 6

| | Percent |
|---|---|
| Polysulfide Resin LP38, mol. wt. 600, 45% | } 99 |
| Resin No. 16, amine equivalent 450, 55% | |
| Di-ter-butyl peroxide, 50% | } 1 |
| Catalyst No. 6, 50% | |

In Example 6, Resins 21, 22, 23 or 24, or their blends, may replace Resin 16.

EXAMPLE 7

| | Percent |
|---|---|
| Polysulfide Resin LP8, mol. wt. 800, 50% | } 85 |
| Resin No. 25, amine equivalent 600, 50% | |
| Zinc oxide, 30% | } 15 |
| Catalyst No. 5, 70% | |

In Example 7, Resin 25 may be replaced in whole or in part by Resins 26, 27, 28 or their blends.

EXAMPLE 8

| | Percent |
|---|---|
| Polysulfide Resin LP33, mol. wt. 1000, 60% | } 80 |
| Resin No. 29, amine equivalent 600, 40% | |
| Tertiary butyl hydroperoxide, 40% | } 20 |
| Catalyst No. 6, 60% | |

In Example 8, Resins 30, 31 or their blends may replace Resin 29.

EXAMPLE 9

| | Percent |
|---|---|
| Polysulfide Resin LP8, mol. wt. 1000, 50% | } 99.5 |
| Resin No. 28, amine equivalent 400, 50% | |
| Di-ter-butyl peroxide, 50% | } 0.5 |
| Catalyst No. 6, 50% | |

Rayon flock, 10% by weight of the total resin content.

EXAMPLE 10

| | Percent |
|---|---|
| Polysulfide Resin LP8, mol. wt. 4000, 15% | } 98½ |
| Polysulfide Resin LP38, mol. wt. 300, 35% | |
| Resin No. 5, 50% | |
| Catalyst No. 7, 10% | } 1½ |
| Tertiary butylhydroperoxide, 90% | |

In Example 10, Catalyst 7 may be replaced by Catalysts 8, 9 or 10.

EXAMPLE 11

| | Percent |
|---|---|
| Polysulfide Resin LP33, 60% | } 95 |
| Polysulfide Resin LP8, 20% | |
| Resin No. 7, 20% | |
| Cumene hydroperoxide, 5% | } 5 |
| Catalyst No. 11, 95% | |

In this example, Catalyst 11 may be replaced by Catalyst 12, 13 or 14.

EXAMPLE 12

| | Percent |
|---|---|
| Polysulfide Resin LP8, 20% | } 90 |
| Polysulfide Resin LP32, 40% | |
| Resin 9, 60% | |
| Tertiary butyl perbenzoate, 80% | } 10 |
| Catalyst No. 15, 20% | |

In Example 12, Catalyst 15 may be replaced by Catalyst 16 or 17.

EXAMPLE 13

| | Percent |
|---|---|
| Polysulfide Resin LP33, 10% | } 85 |
| Polysulfide Resin LP3, 60% | |
| Resin 30, 30% | |
| 1-hydroxy cyclohexylperoxide, 5% | } 15 |
| Catalyst No. 17, 25% | |

EXAMPLE 14

| | Percent |
|---|---|
| Polysulfide Resin LP32, 75% | } 90 |
| Resin 29, 25% | |
| Benzoyl peroxide, 1% | |
| Di-ter-butyl peroxide, 4% | } 10 |
| Catalyst No. 6, 95% | |

EXAMPLE 15

| | Percent |
|---|---|
| Polysulfide Resin LP32, 10% | } 90 |
| Resin 21, 90% | |
| Acetyl peroxide, 95% | |
| Lead peroxide, 5% | } 10 |
| Catalyst No. 17, 95% | |

EXAMPLE 16

| | Percent |
|---|---|
| Polysulfide Resin LP38, 75% | } 85 |
| Resin 22, 12½% | |
| Resin 23, 12½% | |
| Di-ter-butyl hydroperoxide, 80% | } 15 |
| Catalyst No. 10, 20% | |

EXAMPLE 17

| | Percent |
|---|---|
| Polysulfide Resin LP2, 5% | } 98 |
| Polysulfide Resin LP8, 80% | |
| Resin 24, 15% | |
| Catalyst No. 16, 15% | } 2 |
| Acetyl peroxide, 85% | |

EXAMPLE 18

| | Percent |
|---|---|
| Polysulfide Resin LP8, 60% | } 98 |
| Resin 31, 40% | |
| Ter-butyl peroxide, 20% | } 2 |
| Catalyst No. 6, 80% | |

In preparing the sealants, caulking materials, etc. the several ingredients are simply thoroughly mixed together and then applied in the selected manner. As described above the catalysts may be mixed with the pre-prepared resins or resin components to provide packages or units for subsequent mixing to form the final complete product.

It is to be understood that the invention is not to be construed as based upon or dependent upon the theories which we have expressed. Nor is the invention to be regarded as limited to the express procedures or materials set forth, these details being given only by way of illustration and to aid in clarifying the invention. We do not regard such specific details as essential to the invention except insofar as they are expressed by way of limitation in the following claims wherein it is our intention to claim all novelty inherent in the invention as broadly as permissible in view of the prior art.

We claim:

1. The resinous material which is the product of reaction on an approximate mol percentage basis of, from 1.7 to 17.5% of a dihydric alcohol selected from the group consisting of 1,4 butane diol, 2 methyl butane diol, 1,4 hexane diol, 1,3 propylene glycol, butyne diol, and polypropylene glycol having a molecular weight range of 400 to 10,000, from 55 to 85% of a polyisocyanate of the general formula selected from the group consisting of:

$$OCN-R-NCO$$
$$SCN-R-NCS$$
$$SCN-R-NCO$$

in which R is intervening organic group, the dihydric alcohol and the diisocyanate reacting to form a first intermediate, from 1.7 to 18% of the reaction product of a dihydric alcohol from the group consisting of 1,3 butylene glycol, propylene glycol, pentylene glycol, hexylene glycol, dipropylene glycol, diethyene glycol, triethylene glycol, (2,2 diethyl 1,3 propane diol), (2, ethylhexane diol, 1,3), (2, ethoxy methyl 2,4 dimethyl pentane diol 1,5), (2 methyl 2 propyl 1,3 propane diol), and a dibasic organic acid from the group consisting of sebacic, succinic, malonic, adipic, glutaric, suberic, octadecadiendioic, maleic, fumaric, azaleic, itaconic, and citraconic, from 0.4 to 7% water, said reaction product having an acid number from 0.1 to 200, said reaction product and said water being reacted with said first intermediate to form a second intermediate, and from 0.84 to 12% of a polyhydric alcohol having more than 20H groups per molecule reacted with said second intermediate polymer to form the resinous material.

2. A resinous material as in claim 1 and wherein the reaction product of the dihydric alcohol and the dibasic organic acid is in the amount of 50 to 80% for the dihydric alcohol and 20 to 50% for the dibasic organic acid.

3. The resinous material as in claim 1 and having a catalyst selected from the group consisting of quinoline, melamine morpholine, methyl morpholine, thialdine, N-hydroxy ethylmorpholine, N-hydroxy butylmorpholine, pyridine, triethylamine, triethanolamine, tributylamine, hydroxylamine, for said (resinous material) a polysulfide liquid polymer having a molecular weight of from 200 to 10,000 which is the reaction product of a sodium polysulfide and an organic dihalo compound selected from the group consisting of 2,2 dichloro diethylether, triethylene glycol dichloride, dichlorodiethylformal, dichloropolyethylene glycol, dichloropolypropylene glycol, dichlorodiethylacetal, dichlorobutane, dichlorodiethylketone, glycerol dichlorohydrin and which contains at least 2 labile hydrogen containing groups per molecule, and a catalyst for said polysulfide from the group consisting of tertiary butylhydroperoxide, cumenehydroperoxide, ureaperoxide, acetylperoxide, di-ter-butylperoxide, 1-hydroxy cyclohexylhydroperoxide, t-butylperbenzoate, sodium carbonate peroxide, magnesium peroxide, zinc peroxide, lead peroxide, calcium peroxide, sodium pyrophosphate peroxide, barium peroxide, sodium peroxide, zinc oxide, cadmium oxide, and mercury oxide, said total of said catalyst components comprising from .1 to 20% by weight of the total resins, and said polysulfide and said polysulfide catalysts being added to said product of reaction and said product of reaction catalysts to react and form a second resinous material.

4. A resinous material which is the product of reaction on an approximate mol percentage basis of from 1.7 to 17.5% of a dihydric alcohol selected from the group consisting of 1,4 butane diol, 2 methyl butane diol, 1,4 hexane diol, 1,3 propylene glycol, butane diol, and polypropylene glycol having a molecular weight range of 400 to 10,000, from 55 to 85% of toluene diisocyanate, the dihydric alcohol and the diisocyanate reacted to form a first intermediate, from 1.7 to 18% of the reaction product of from 50 to 80% 1,3 butylene glycol, and from 20 to 50% sebacic acid, from 0.4 to 7% water, said reaction product having an acid number of from 0.1 to 200, said reaction product and said water being reacted with said first intermediate to form a second intermediate, and from 0.84 to 12% of a polyhydric alcohol having more than 20H groups per molecule reacting with said second intermediate polymer to form the resinous material.

5. A sealant prepared on an approximate percentage by weight basis, from 5 to 95% of a polysulfide liquid polymer having at least two labile hydrogen containing groups per molecule and containing the repeating unit (—SS CH$_2$ CH$_2$O CH$_2$ O CH$_2$CH$_2$—) and having a molecular weight of from 200 to 10,000 and which is the reaction product of a sodium polysulfide and an organic dihalo compound selected from the group consisting of 2,2 dichlorodiethylether, triethylene glycol dichloride, dichlorodiethylformal, dichloropolyethylene glycol, dichlorobutane, dichlorodiethylketone, glycerol dichlorohydrin, from 5 to 95% of a polyurethane having an amine equivalent of from 150 to 1,000 and which is the reaction product of on an approximate mol percentage basis from 1.7 to 17.5% of a dihydric alcohol selected from the group consisting of 1,4 butane diol, 2 methyl butane diol, 1,4 hexane diol, 1,3 propylene glycol, butyne diol, and polypropylene glycol having a molecular weight range of from 400 to 10,000, from 55 to 85% of polyisocyanate of the general formula selected from the group consisting of:

OCN—R—NCO
SCN—R—NCS
SCN—R—NCO

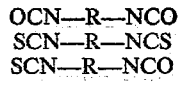

in which R is an intervening group, the dihydric alcohol and the diisocyanate reacting to form a first intermediate, from 1.7 to 18% of the reaction product of a dihydric alcohol from the group consisting of 1,3 butylene glycol, propylene glycol, pentylene glycol, hexylene glycol, dipropylene glycol, diethylene glycol, triethylene glycol, (2,2 diethyl 1,3 propane diol),(2 ethylhexane diol, 1,3), (2 ethoxy methyl 2,4 dimethyl pentane diol 1,5), (2 methyl propyl 1,3 propane diol), and a dibasic acid from the group consisting of sebacic, succinic, malonic, adipic, glutaric, suberic, octadecadiendioc, maleic, fumaric, azaleic, itaconic and citraconic, from 0.4 to 7% water, said reaction product having an acid number from 0.1 to 200, said reaction product and said water being reacted with said first intermediate to form a second intermediate, from 0.84 to 12% of a polyhydric alcohol having more than 20H groups per molecule reacted with said second intermediate polymer to form a resinous material, and from 0.1 to 20% of a catalyst, said catalyst including from 5 to 95% by weight of the total catalyst of an organic peroxide for accelerating cure of said polysulfide polymer and selected from the group consisting of tertiary butyl hydroperoxide, cumene hydroperoxide, ureaperoxide, acetylperoxide, di-ter-butylperoxide, 1 hydroxy cyclohexylhydroperoxide, t-butylperbenzoate and from 5 to 95% by weight of the total catalyst of a heterocyclic nitrogen base composition for accelerating the cure of said polyurethane resinous material, said nitrogen base composition being compatible with said organic peroxide and being selected from the group consisting of quinoline, melamine, morpholine, methamorpholine, thialdine, N-hydroxy ethylmorpholine, N-hydroxy butylmorpholine, pyridine, triethylamine, triethanolamine, tributylamine, and hydroxylamine, said polysulfide polymer and polysulfide polymer catalyst being reacted with said polyurethane resinous material and polyurethane resinous material catalyst to form said sealant.

6. A sealant prepared on an approximate percentage by weight basis, from 5 to 95% of a polysulfide liquid polymer having at least two labile hydrogen containing groups per molecule and containing the repeating unit (—SS CH$_2$ CH$_2$O CH$_2$O CH$_2$CH$_2$—) and having a molecular weight of from 200 to 10,000 and which is the reaction product of a sodium polysulfide and an organic dihalo compound selected from the group consisting of 2,2 dichlorodiethylether, triethylene glycol dichloride, dichlorodiethylformal, dichloropolyethylene glycol, dichlorobutane, dichlorodiethylketone, glycerol dichlorohydrin, from 5 to 95% of a polyurethane having an amine equivalent of from 150 to 1,000 and which is the reaction product of on an approximate mol percentage basis from 1.7 to 17.5% of a dihydric alcohol selected from the group consisting of 1,4 butane diol, 2 methyl butane diol, 1,4 hexane, 1,3 propylene glycol, butyne diol, and polypropylene glycol having a molecular weight range of from 400 to 10,000, from 55 to 85% of polyisocyanate of the general formula selected from the group consisting of:

OCN—R—NCO
SCN—R—NCS
SCN—R—NCO in which R is an intervening group, the dihydric alcohol and the diisocyanate reacting to form a first intermediate, from 1.7 to 18% of the reaction product of from 50 to 80% of 1,3 butylene glycol and from 20 to 50% of sebacic acid, from 0.4 to 7% water, said reaction product having an acid number from 0.1 to 200, said reaction product and said water being reacted with said first intermediate to form a second intermediate, from 0.84 to 12% of a polyhydric alcohol having more than 2OH groups per molecule reacted with said second intermediate polymer to form a resinous material, and from 0.1 to 20% of a catalyst, said catalyst including from 5 to 95% by weight of the total catalyst of an organic peroxide for accelerating cure of said polysulfide polymer and selected from the group consisting of tertiary butyl hydroperoxide, cumene hydroperoxide, ureaperoxide, acetylperoxide, di-ter-butylperoxide, 1 hydroxy cyclohexylhydroperoxide, t-butylperbenzoate and from 5 to 95% by weight of the total catalyst of a heterocyclic nitrogen base composition for accelerating the cure of said polyurethane resinous material, said nitrogen base composition being compatible with said organic peroxide and being selected from the group consisting of quinoline, melamine, morpholine, methylmorpholine, thialdine, N-hydroxy ethylmorpholine, N-hydroxy butylmorpholine, pyridine, triethylamine, triethanolamine, tributylamine, and hydroxylamine, said polysulfide polymer and polysulfide polymer catalyst being reacted with said polyurethane resinous material and polyurethane resinous material catalyst to form said sealant.

References Cited in the file of this patent

UNITED STATES PATENTS

| 2,424,883 | Habgood et al. | July 29, 1947 |
| 2,466,963 | Patrick et al. | Apr. 12, 1949 |
| 2,602,783 | Simon et al. | July 8, 1952 |
| 2,764,565 | Hoppe et al. | Sept. 25, 1956 |

FOREIGN PATENTS

| 55,581 | France | May 14, 1952 |
| 878,856 | Germany | June 8, 1953 |

OTHER REFERENCES

De Bell, "German Plastics Practice," page 316, copyright 1946 by De Bell and Richardson, Springfield, Mass.